(12) United States Patent
McIntyre et al.

(10) Patent No.: US 8,353,423 B2
(45) Date of Patent: Jan. 15, 2013

(54) COOKWARE SYSTEM FOR INCREASED SAFETY

(75) Inventors: David Harrison McIntyre, College Station, TX (US); Roy Harrison McIntyre, Youngsville, LA (US)

(73) Assignee: Bedias Creek LLC, College Station, TX (US)

( * ) Notice: Subject to any disclaimer, the term of this patent is extended or adjusted under 35 U.S.C. 154(b) by 330 days.

(21) Appl. No.: 12/831,373

(22) Filed: Jul. 7, 2010

(65) Prior Publication Data

US 2012/0006826 A1 Jan. 12, 2012

(51) Int. Cl.
*A47J 36/00* (2006.01)
*A47J 27/00* (2006.01)

(52) U.S. Cl. ............... 220/573.1; 220/752; 220/759; 220/769; 220/770; 220/772; 220/912; 99/324

(58) Field of Classification Search ........... 220/573.1, 220/752, 755, 757, 759, 762, 764, 768, 769, 220/770, 772, 912; 99/324
See application file for complete search history.

(56) References Cited

U.S. PATENT DOCUMENTS

| | | | |
|---|---|---|---|
| 1,317,715 A * | 10/1919 | Luttringhaus | 220/768 |
| 2,362,720 A | 11/1944 | Reichart | |
| 2,494,159 A | 1/1950 | Bernstein | |
| 2,733,947 A | 2/1956 | Platt | |
| 2,965,405 A | 12/1960 | Herrick | |
| 3,262,728 A | 7/1966 | Atterbury | |
| 3,334,782 A * | 8/1967 | Friberg | 220/759 |
| 3,815,175 A * | 6/1974 | Szabados | 220/759 |
| 4,083,081 A | 4/1978 | Witte | |
| 4,965,907 A | 10/1990 | Baumgarten | |
| 5,121,848 A | 6/1992 | Waligorski | |
| 5,373,608 A * | 12/1994 | Welch | 16/425 |
| 5,462,327 A | 10/1995 | Quick | |
| 5,887,751 A | 3/1999 | Kroscher | |
| 6,260,733 B1 | 7/2001 | Eimerman | |
| 6,439,420 B1 | 8/2002 | Park | |
| 6,658,701 B1 | 12/2003 | DeHart et al. | |
| 6,694,868 B1 | 2/2004 | Hung | |
| 6,910,248 B2 | 6/2005 | Fiocco | |
| 7,240,403 B1 | 7/2007 | Richardson | |
| D596,896 S | 7/2009 | Munari | |
| 7,975,874 B2 * | 7/2011 | Scott et al. | 220/759 |

(Continued)

FOREIGN PATENT DOCUMENTS

CN 2627959 Y 7/2007
(Continued)

*Primary Examiner* — Anthony Stashick
*Assistant Examiner* — Madison L Poos
(74) *Attorney, Agent, or Firm* — Crain, Caton & James, P.C.; James E. Hudson, III

(57) ABSTRACT

A cookware system is provided having a container, particularly a cooking vessel, at least one downwardly directed receiver, and a non-coupling handle having a contact member at its end sized to the receiver, which combination provides increased safety and utility. By virtue of the downwardly directed receiver and the upwardly directed contact member, the handle of the cookware system contacts and drives the cooking vessel only during and for so long as the operator, the cook, provides upward force to the handle to temporarily engage the cooking vessel. Upon removal of the upward force from the operator, the handle disengages from the receiver, preventing the potential that a person, whether the operator, a child or another, could contact the handle and cause a spill or burn.

20 Claims, 12 Drawing Sheets

U.S. PATENT DOCUMENTS

2007/0227366 A1 10/2007 Garziera
2008/0006645 A1 1/2008 Sup
2011/0132919 A1* 6/2011 Takuski et al. ................ 220/759

FOREIGN PATENT DOCUMENTS

| EP | 1378195 A1 | 1/2004 |
| EP | 2172141 A1 | 4/2010 |

* cited by examiner

COOKWARE SYSTEM FOR INCREASED SAFETY

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

1. Field of Invention

The present invention relates generally to a system having a cooking or baking vessel, a container such as a pot or pan, together with a separate handle, designed for improved safety. More particularly, the present invention relates to a cooking or baking vessel having a separate, non-coupling handle which docks with a receiver associated with the vessel and which immediately ceases to engage the vessel when upward force is no longer applied at the non-grip portion of the handle.

2. Description of the Related Art

Attempts to develop handles for cooking or baking vessels, such as pots and pans have largely focused on the benefit of a detachable handle for storage purposes. Few attempts have been made to develop handles for cooking or baking vessels to reduce the likelihood of catastrophic burns caused by careless contact with stovetop handles or by unintended contact with stovetop handles by small children. As a result, most attempts to develop handles for cooking or baking vessels have focused on handles which may be actively detached and removed from vessels, but which otherwise are attached and affixed to pots, and become integral components thereof.

Each year more than 30,000 children under the age of 4 are injured in cooking accidents, usually when a protruding handle from a pot or pan is pulled or bumped, dropping hot food or liquid on them from above. A similar danger exists to employees in commercial kitchens where cooks work in close proximity to many protruding handles. And the danger of injury may be generalized to a number of other settings where handles are required to manipulate vessels containing hot, caustic, or otherwise hazardous liquids, but overlooked or unattended handles create a "bump-and-spill" hazard for workers.

Various patents exist which teach the use of handles to be attached or detached for convenience. However none identify safety as a primary function of the invention. Consequently, all current designs work by some mechanism (pins, springs, pumps, latches or locks) which must be manually actuated to secure (or couple, attach, affix or join) the handle in place and again manually actuated to remove the handle from the vessel. If the mechanism is not intentionally actuated for handle removal, the handle will default to remain attached to the vessel, thus presenting the same danger as a fixed handle. Moreover, the prior art teaches use of attachment systems which require inclusion of various additional parts and which require a substantial protrusion from and beyond the body of the cookware. These systems thus have increased cost due to the necessity of additional moving parts and shorter lifespans as wear of these various moving parts can render the attachment system inoperable. This could be particularly dangerous as the occasion of such failure cannot be predicted and is most likely to occur during use, when the cookware contains food and may contain a heated liquid. Moreover, as these systems include attachment systems which protrude from and beyond the body from the container body, the risk of contact and accidental spillage remains to anyone near the cooking surface.

Therefore there is a need in the art for a cookware system which reduces the likelihood of accidental burns to users and others in the kitchen, particularly children, by eliminating the presence of a handle or extension from the cookware body. Thus, there is a need for a cookware system wherein the handle or handles do not attach or become affixed to the cooking vessel and which instead have a handle or handles which cease to be in contact with the vessel upon removal of operable force from the operator, such as the cook, and which does so without conscious or intentional operator action or input when the pot is rested upon the heating surface. Additionally there is a need for a cookware system which provides for such safer operation without the use of various moving parts susceptible to failure and which can be readily, efficiently and relatively inexpensively manufactured.

SUMMARY OF THE INVENTION

The present invention therefore meets the above needs and overcomes one or more deficiencies in the prior art by providing a cookware system wherein the handle or handles engage the cooking vessel only during and for so long as the operator, the cook, provides upward force to the handle to temporarily contact the cooking vessel. The present invention, a handling system for cookware, provides a handle assembly which mates, which may be by contacting and fitting within, a dock, which may be a handling ring assembly, joined to the container to be moved or controlled.

Unlike prior inventions, the present invention uniquely provides a handle that does not remain in place unless an operator is actively applying upward force to the handle into a receiver in fixed relationship with the cooking vessel. In the absence of the application of upward force to the handle when the vessel is resting on surface, gravity causes the handle to separate from the receiver associated with the cooking vessel. While only one receiver is necessary, in further embodiment, a plurality of receivers are utilized, thus affording the opportunity to have multiple locations about the entire perimeter of the cooking vessel for the handle to temporarily contact a receiver. The invention can thus be utilized to match the curvature of a round, oval or even square object (example: a cooking pot) so that a common size male docking flange or contact member may be used for objects of different diameters. Alternatively, the sizes of receiver and the male docking flange or contact member may be sized depending on the size of the cooking vessel. The present invention thereby provides a handling system for lifting, moving and using containers while eliminating the dangers and issues presented by a protruding handle when the handle is not in use.

Moreover, the invention permits use of various handles having a number of orientations and styles (vertical, horizontal, canted, "suitcase style," etc.) in connection with a single vessel, all providing the same safe handling features.

As a result, the cookware system reduces the likelihood of accidental burns to users and others in the kitchen, particularly children, by eliminating the presence of a handle or extension from the cookware body, provides for such safer operation without the use of various moving parts susceptible to failure and which can be readily, efficiently and relatively inexpensively manufactured.

Additional aspects, advantages, and embodiments of the invention will become apparent to those skilled in the art from the following description of the various embodiments and related drawings.

BRIEF DESCRIPTION OF THE DRAWINGS

So that the manner in which the described features, advantages, and objects of the invention, as well as others which will become apparent; are attained and can be understood in detail; more particular description of the invention briefly summarized above may be had by referring to the embodiments thereof that are illustrated in the drawings, which drawings form a part of this specification. It is to be noted, however, that the appended drawings illustrate only typical preferred embodiments of the invention and are therefore not to be considered limiting of its scope as the invention may admit to other equally effective embodiments.

In the drawings.

DESCRIPTION OF THE PREFERRED EMBODIMENT

Figure 1:
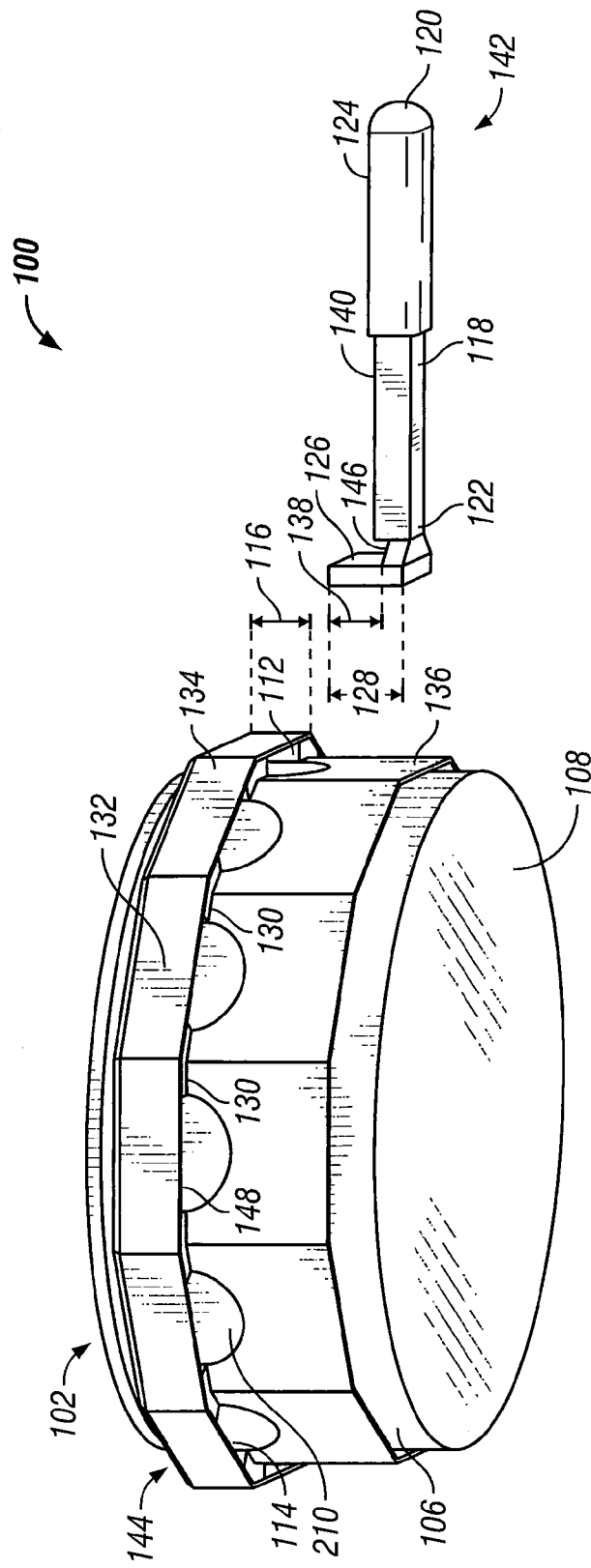
FIG. 1 is a bottom-oriented illustration of a first embodiment of the present invention.
Figure 2:
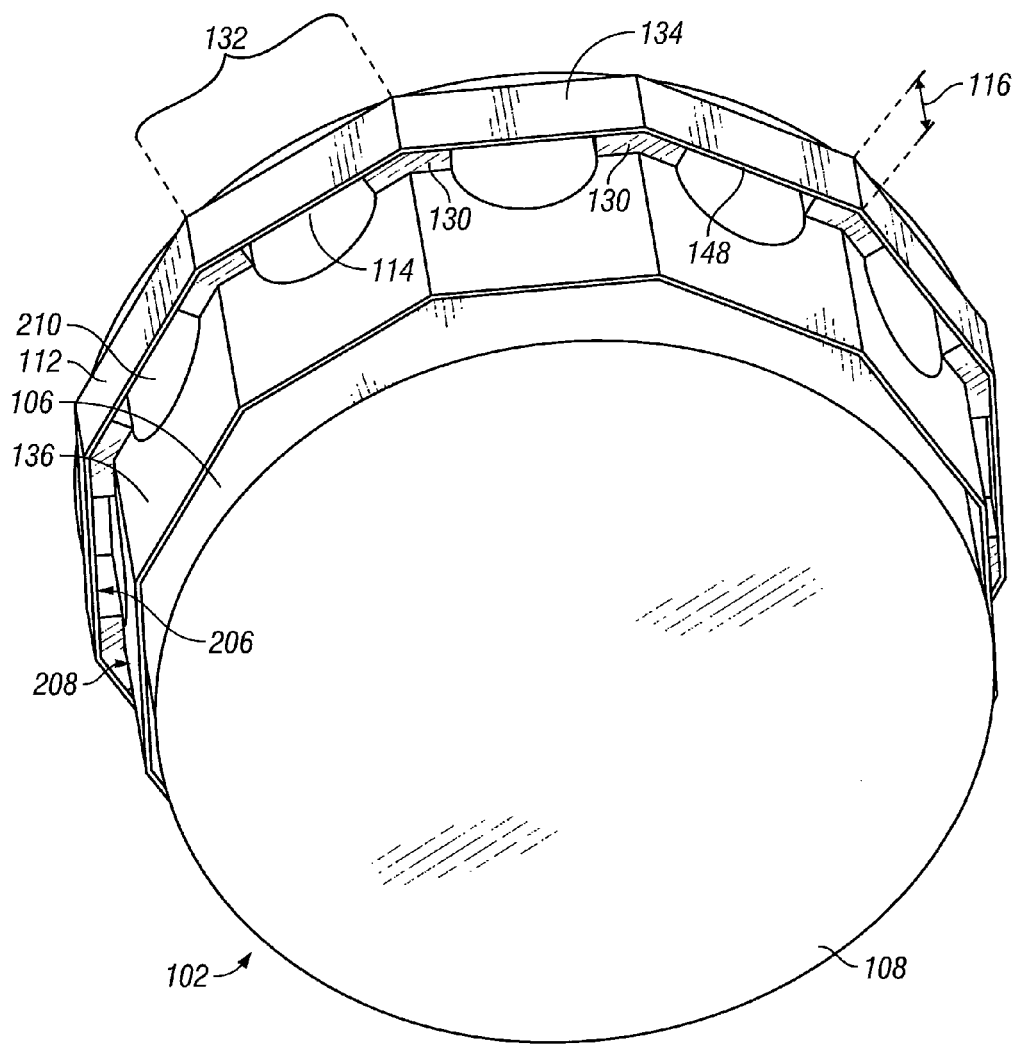
FIG. 2 is an illustration of the container of the first embodiment of the present invention.
Figure 3:
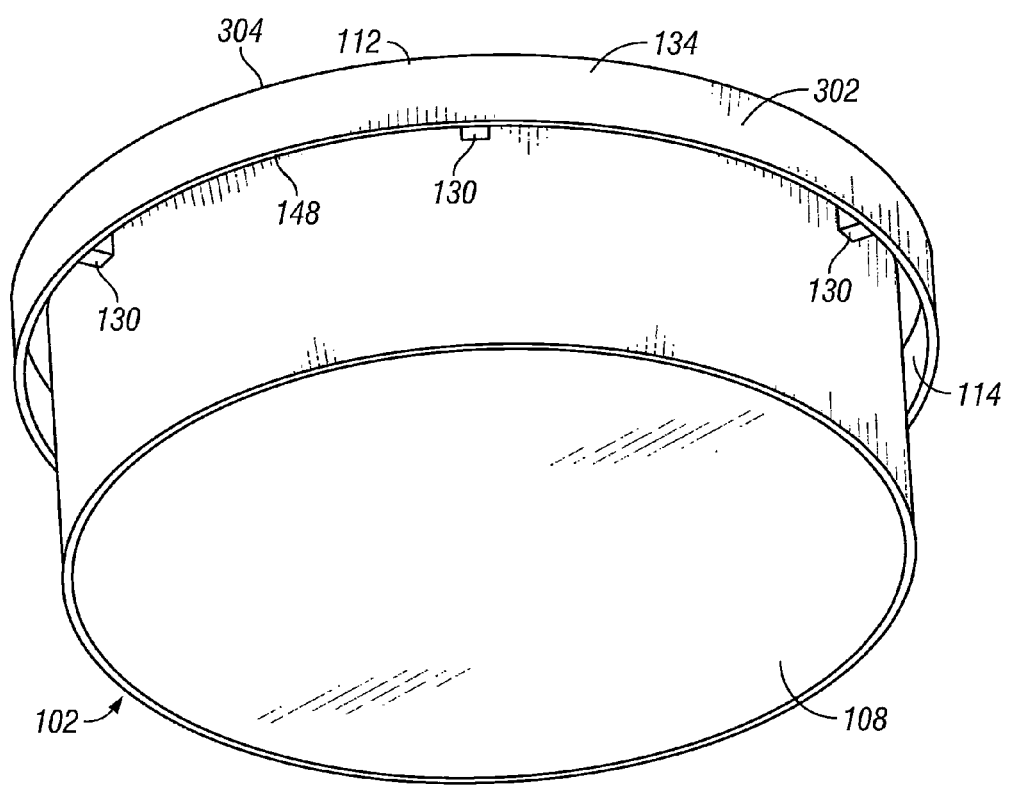
FIG. 3 is an illustration of a container of a second embodiment of the present invention.
Figure 4:
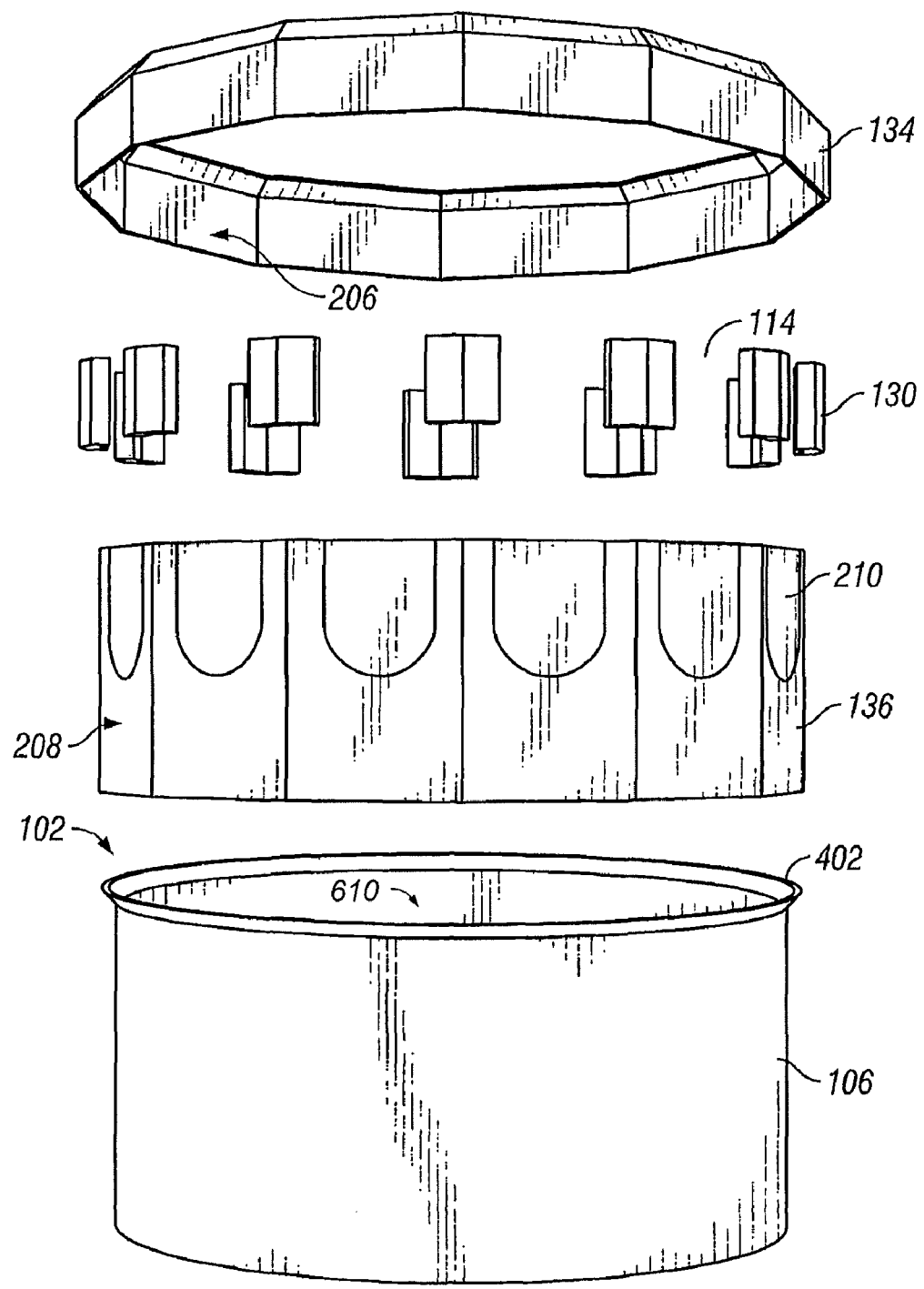
FIG. 4 is an illustration of an exploded view of the parts of the container of the first embodiment of the present invention.
Figure 5:
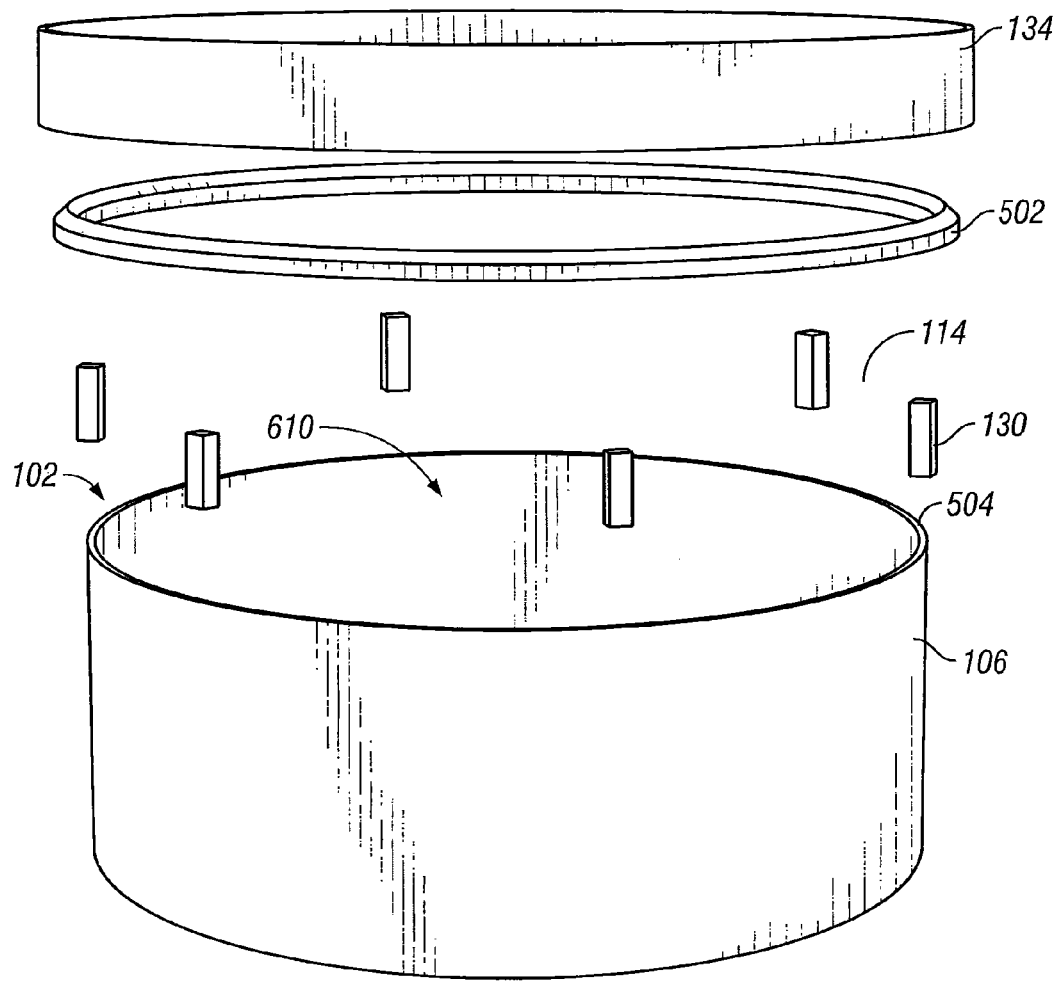
FIG. 5 is an illustration of an exploded view of the parts of the container of the second embodiment of the present invention.
Figure 6:
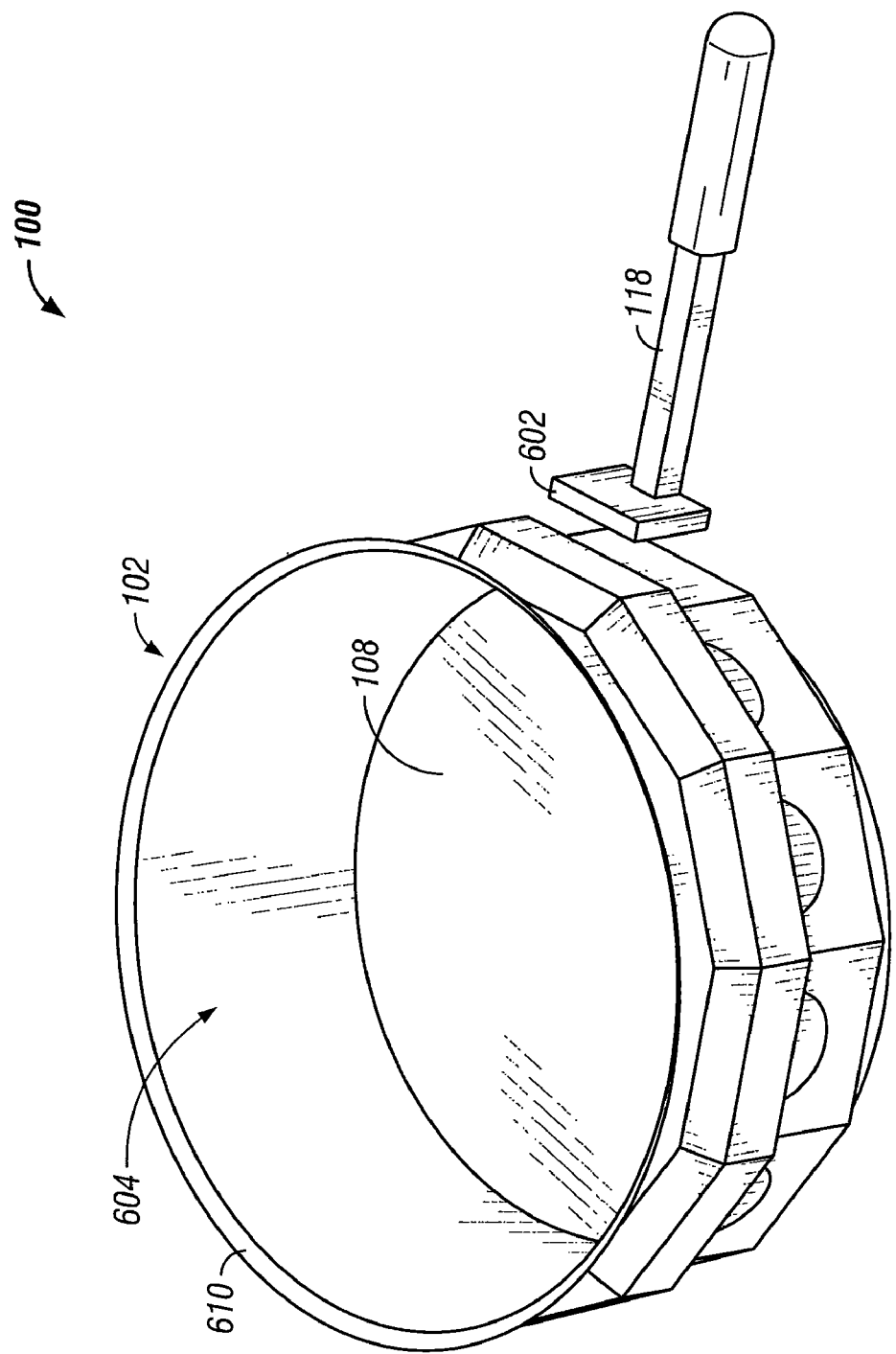
FIG. 6 is a top-oriented illustration of a first embodiment of the present invention.
Figure 7A:
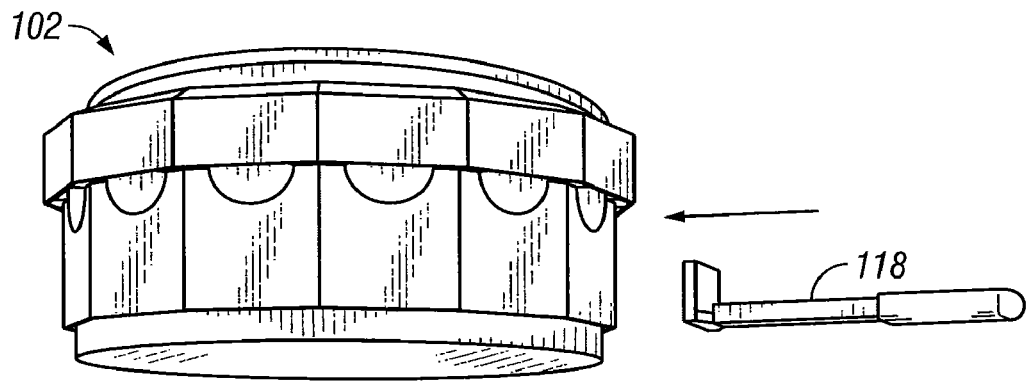
FIG. 7 is a series of illustrations (FIGS. 7(a), 7(b) and 7(c)) depicting the steps in employing the present invention.
Figure 7B:
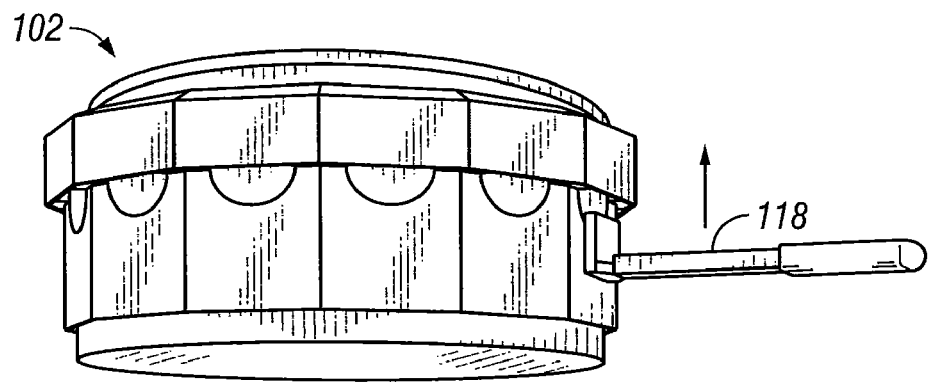
Figure 7C:
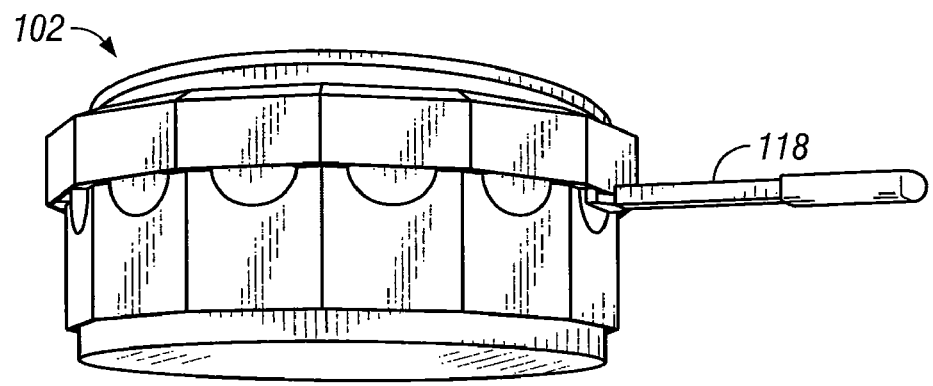

Referring to FIGS. 1-8, the improved cookware system 100 provides a container 102, at least one receiver 112, and a non-coupling handle 118 sized to the receiver 112. Referring to FIG. 1, the container 102 may be any type of pot, pan or dish intended for use on a stove, grill, oven or the like. Examples of such containers, which may be characterized as cookware or bakeware, include dutch ovens, braisers and roasters, frying pans, skillets, sauce pans and stockpots, and cake pans and sheet pans. Regardless of the type of cookware, the container 102 has an interior 604, as depicted in FIG. 6, a vertically-inclined exterior wall 106, a bottom 108, and a top opening 610, as depicted in FIG. 6, providing access to the interior 604. As illustrated in FIGS. 4 and 5, the top opening 610 may be an orifice or opening formed by the upper edge 402 or 504 of the vertically-inclined exterior wall 106. The vertically-inclined exterior wall 106 of the container 102 need not be purely vertical, but is, intended for the purposes of this invention to be generally vertical, i.e. not forming an acute angle to the heating surface. Ideally, the exterior wall 106 is purely vertical.

Figure 10:
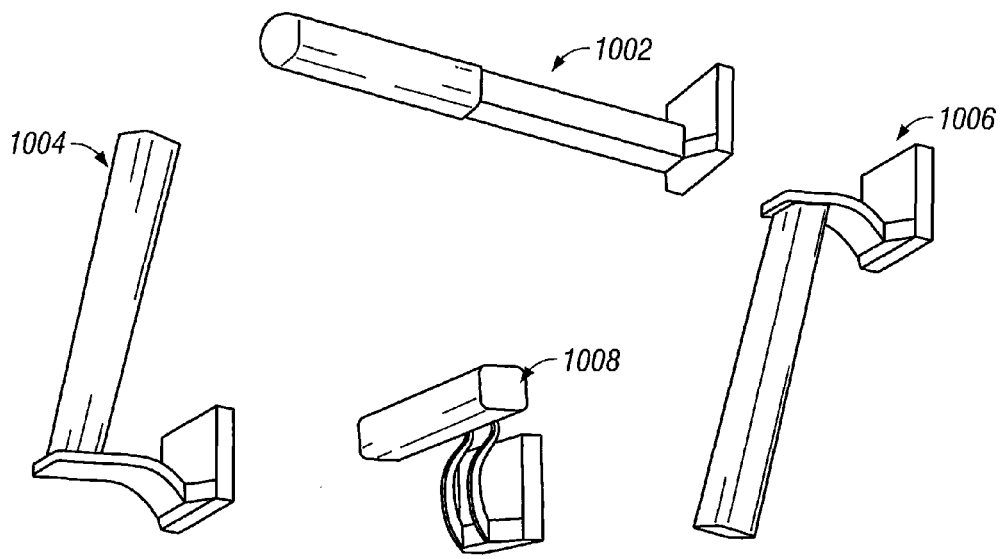
FIG. 10 is an illustration of various handles which may be used in the present invention.
Figure 11:
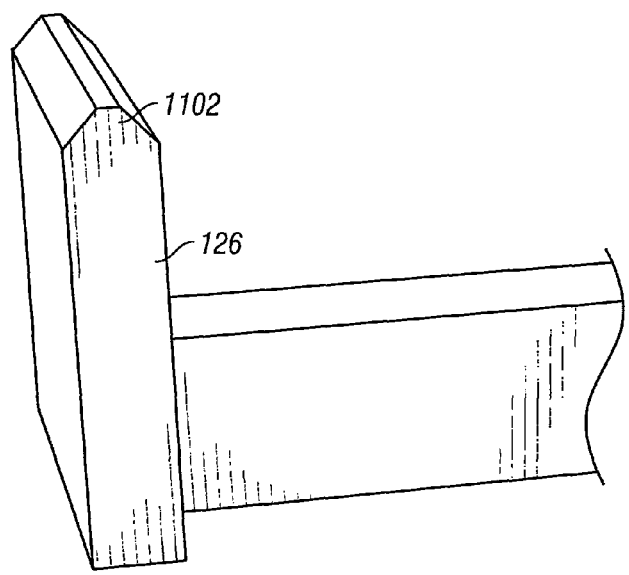
FIG. 11 is a view of one embodiment of the contact member of the present invention.

Referring to FIG. 1, at least one receiver 112 is provided and is positioned in fixed relation to the vertically-inclined exterior wall 106 of said container 102. Each receiver 112 may be directly affixed, attached, joined to or made from the vertically-inclined exterior wall 106 of said container 102 or may be fixed in relation to the vertically-inclined exterior wall 106 of said container 102 by virtue of other parts. In the alternative embodiment depicted in FIG. 3, each receiver 112 is constructed so as not to protrude from the container 102 in such a way as to form an arm or extension which might be contacted by the user and to provide a location for application of force from the user to cause movement of the container 102. Each receiver 112 has a receiver downwardly-oriented opening (or space or void) 114 of fixed size and shape and which has depth 116 and which preferably is not circular. This opening 114 thus provides an empty area which functions as female docking space. Ideally, receivers 112 are positioned about the entire circumference of the container 102 for ease of access regardless of the orientation of the container 102 relative to the operator, with no more than one, receiver 112 at any longitudinal position along the circumference. In the preferred embodiment, the receivers 112 are constructed to provide a smooth exterior to or about container 102. Finally, the cookware system 100 includes a non-coupling handle 118, which fits within, contacts and drives a receiver 112 when lifted into a receiver 112 and maintained in relation under upward force from the handle 118 against the receiver 112, thus not coupling with, or becoming integral to or joined to, the receiver 112. The handle 118 has a first end 120 and a second end 122 and may be part of a handle assembly 142 which includes a grip member 124 and a contact member 126 connected by the handle neck 140. Ideally, a grip member 124 is positioned at or adjacent the first end 120 of the handle 118. This grip member 124 may be of any of various types of handles, such as a flat grip, a basket grip, a lifting handles, loop or tab handles. The type of grip utilized can be selected based on the intended use of the cookware at the time, thus providing a variety of options for handles, such as those depicted in FIG. 10, such as the conventional pot handle 1002, various vertically-oriented handles 1004, 1006, or a pair of lifting handles 1008. Referring to FIG. 1, at the opposite end of the handle 118, its second end 122, the handle has an upwardly-oriented contact member 126 of fixed size and shape and having a height 128. The upwardly-oriented contact member 126 is sized and has a shape selected to fit within the receiver 112 without interference but to fit sufficiently well within the receiver 112 to fit within, contact and drive the receiver 112 and prevent lateral rotation of the handle 118 relative to the receiver 112. Ease of entry may be accomplished, in part, by incorporating a tapered end 1102 onto contact member 126, as depicted in FIG. 11.

Referring to FIG. 1, the cookware system 100 may also include at least two-spaced-apart depth members 130, an outer member 132, where the spaced-apart depth members 130 are positioned intermediate the outer member 132 and the container 102. Thus, the size and shape of a receiver downwardly-oriented opening 114 can be defined largely by how the spaced-apart depth members 130 are positioned intermediate the outer member 132. Thus, each spaced-apart depth member 130 also functions as a side brace for the receiver downwardly-oriented opening 114.

In the embodiment depicted in FIGS. 1, 2, 4, 6 and 7a, 7b and 7c, the cookware system 100 may include a plurality of spaced-apart depth members 130 positioned equidistant about the exterior wall 106 of the container 102 to define, together with the outer ring 134, which may be a series of outer members 132 or a ring atop outer members 132, a plurality of receivers about the entirety of the vertically-inclined exterior wall 106 of the container 102. Thus, the spaced-apart depth members 130 may be positioned intermediate the outer ring 134 and the container 102. Thus regardless of the orientation of the cookware to the operator, a receiver 112 is conveniently accessible to the operator. This plurality of receivers 112 may thus be present regardless of the shape of the container 102, which may be, for example, round, oblong, or rectangular.

Figure 12:
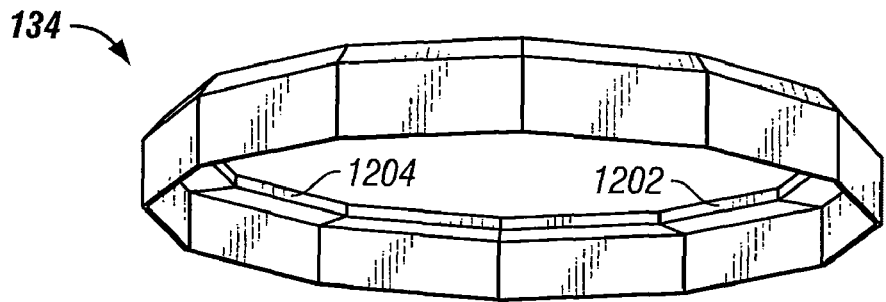
FIG. 12 is a view of one embodiment of the outer ring of the present invention.

To better provide a readily constructed fixed size and shape of receiver downwardly-oriented opening 114 of the receiver 112, the cookware system 100 may further include an inner ring 136 intermediate the plurality of spaced-apart depth members 130 and the container 102. The spaced-apart depth members 130 may be affixed to this inner ring 136. In the absence of an inner ring 136, the upwardly-oriented contact member 126 may, but is not required to, include a curved face 902 and a top edge 904, depicted in FIG. 9, to fit within, contact and drive the vertically-inclined exterior wall 106 of the container 102, rather than the flat face 602, depicted in FIG. 6. Referring to FIG. 2, when an inner ring 136 is used, the outer ring 134 may have an inner surface 206 and the inner ring 136 may have an outer surface 208, which, together with the spaced-apart depth members 130 fully define the receiver downwardly-oriented opening 114 and the receiver 112 and provide the surfaces against which contact member 126 may apply force and slide without interference. Referring to FIG. 12, the outer ring 134 may be associated with an upper outer ring 1204, which is substantially perpendicular to the outer ring 134 and which ideally is bounded by and does not extend beyond the outer ring 134 and inclined towards the container 102 (not shown) so as to approach or contact the container 102. The upper outer ring 1204 may further include a segment 1202, which may be a separate member or thickened section which defines the top of receiver 112 and provides a final surface against which contact member 126 may apply force. A contact member 126 on the non-coupling handle 118 is therefore sized to slide upward and without interference into the receiver downwardly-oriented opening 114 and the receiver 112. The contact member 126 may be rectangular or trapezoidal, or another shape. As can be appreciated, even novelty shapes, such as the shape of the State of Texas, may be used as the shape of the receiver downwardly-oriented opening 114 of the receiver 112 and of the contact member 126. Preferably, the receiver downwardly-oriented opening 114 of the receiver 112 and the contact member 126 are not circular in shape as such a shape precludes single side, single handle lifting of a container 102 without the risk of rotation between the receiver 112 and contact member 126, which would pose a danger to the operator.

Figure 13:
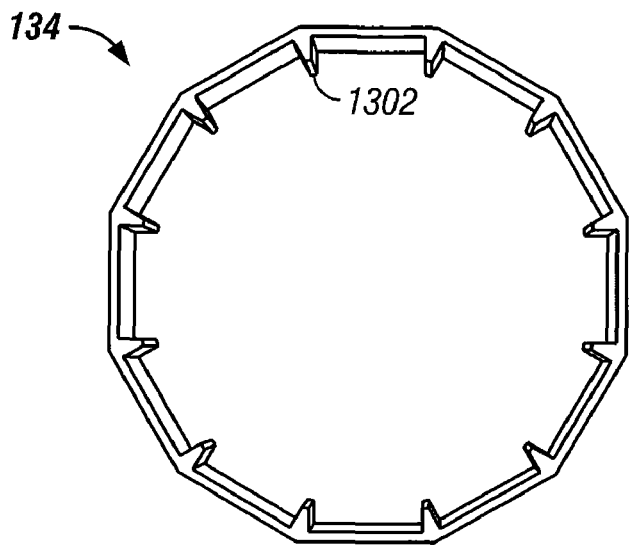
FIG. 13 is a view of one embodiment of the outer ring of the present invention depicting one system for attachment to the container.
Figure 14:
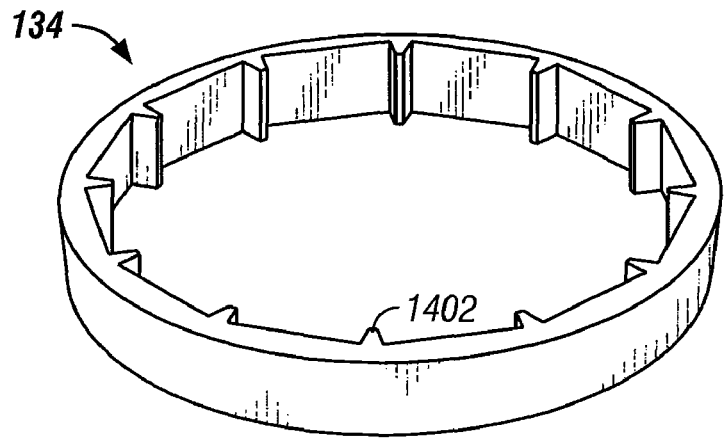
FIG. 14 is a view of one embodiment of the outer ring of the present invention depicting one system for attachment to the container.
Figure 15:
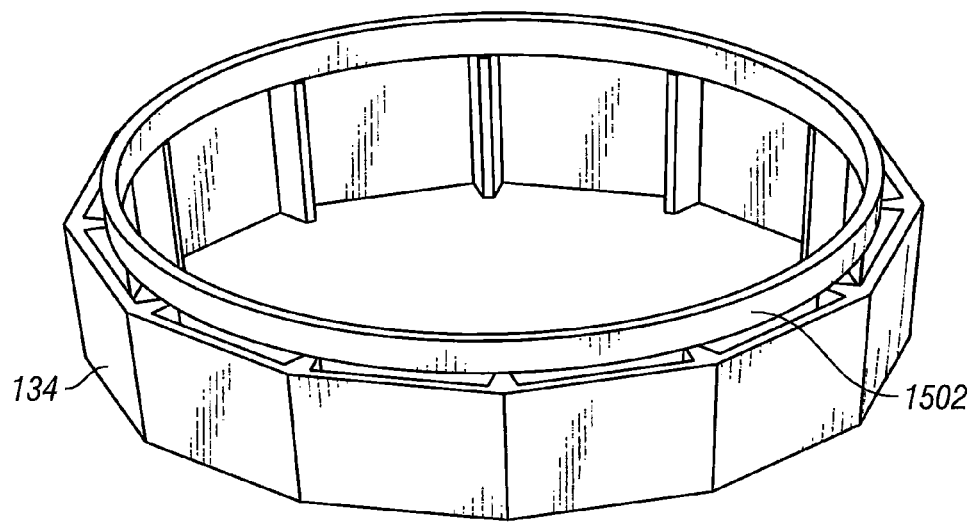
FIG. 15 is a view of one embodiment of the outer ring of the present invention depicting one system for attachment to the container.
Figure 16:
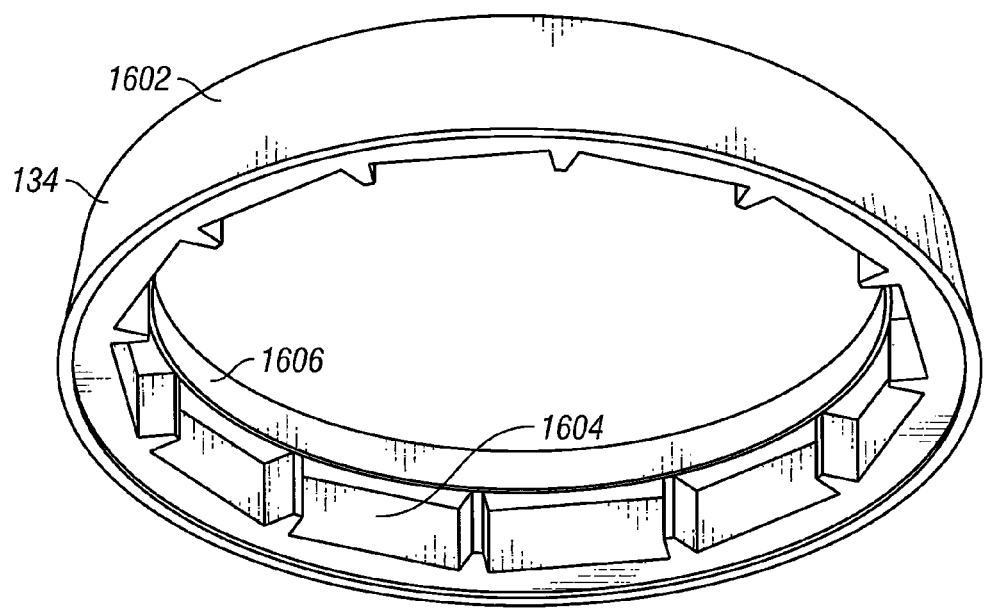
FIG. 16 is a view of one embodiment of the outer ring of the present invention depicting one system for attachment to the container.

As can be appreciated, the outer ring 134 may be affixed to the container 102 by various systems known in the art. These include use of an interference fit, such as depicted in FIG. 13, wherein the outer ring 134 may include a plurality of teeth 1302 providing an inner diameter slightly smaller than the outer diameter of the container 102. These also include tack welding of an outer ring 134 by welding the underside of some of teeth 1402 attached to the outer ring 134, as illustrated in FIG. 14, which requires a less precise fit, will generally be obscured from view, but which has the potential to require excessive time and to burn any non-stick coating of the container 102. These further include use of grip ring 1502, such as depicted in FIG. 15, and an outer ring 134, wherein the grip ring 1502 can be an interference fit or soldered to the container 102 and would maintain the outer ring 134 in position. These would also include, among others, use of a ring 1602 with a polymer ring 1604 that fits tightly within, wherein an upper vertical flange 1606 of the ring 1602, generally horizontal in orientation, can be soldered or joined to the container 102, and the polymer ring 1604 then fitted within the ring 1602 and adhered to it, such as depicted in FIG. 16.

Still referring to FIGS. 1, 2, 4, 6 and 7a, 7b and 7c, the cookware system 100 may also include a docking area indicator 210 positioned adjacent said receiver downwardly-oriented opening 114 of said receiver 112. A docking area indicator 210 may be particularly helpful to identify to the user the location of the receiver downwardly-oriented opening 114, necessary for use of the cookware system 100. The docking area indicator 210 may be any area intended to indicate the location of the receiver downwardly-oriented opening 114, such as an area of differently colored material, an engraved portion, a contrasting color or texture, or even a depressed area. As depicted in FIGS. 1, 2, 4, 6 and 7a, 7b and 7c, the docking area indicator 210 is preferably located below the outer ring 134 on the outer surface 208 of inner ring 136. The outer ring 134 and depth members 130 may be considered a handling ring assembly 144, which may also include an inner ring 136.

Figure 9:
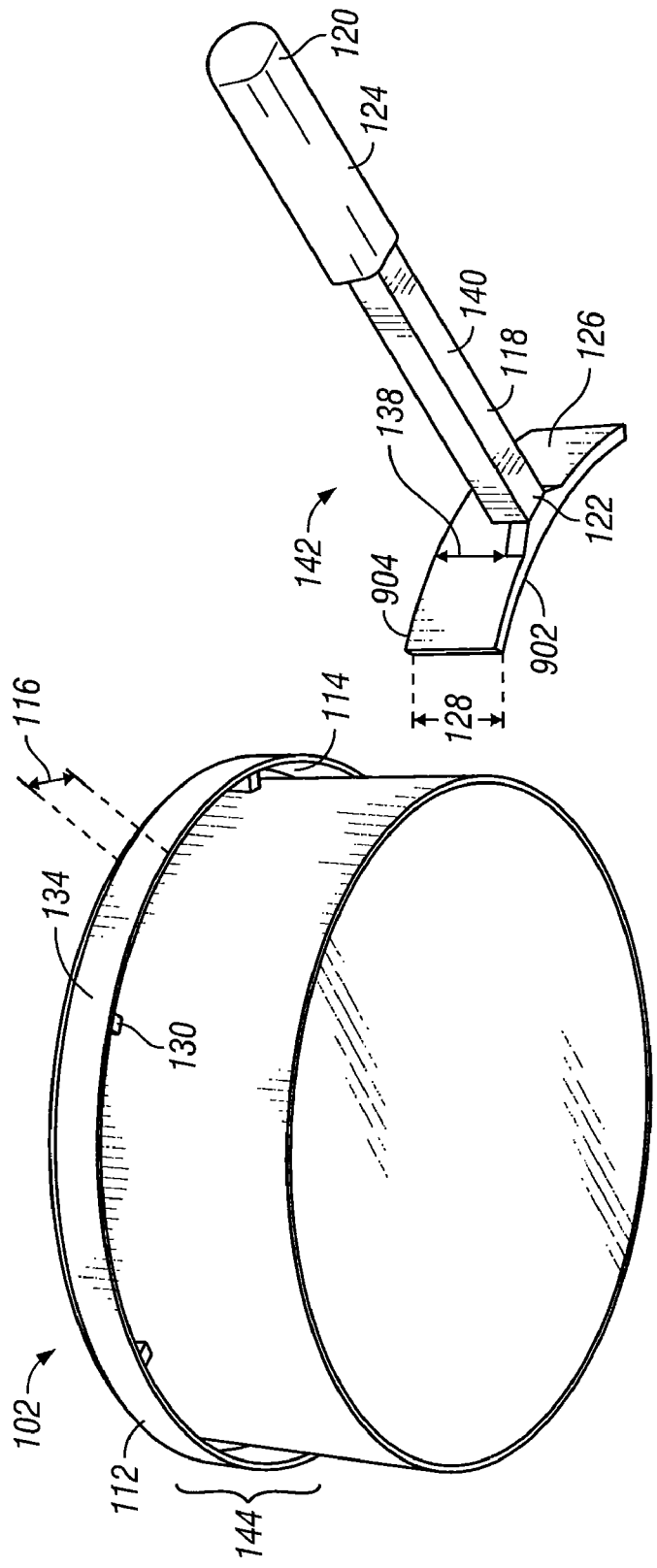
FIG. 9 is a bottom-oriented illustration of the second embodiment of the present invention.

Referring to FIG. 2, the receiver 112, having the receiver downwardly-oriented opening 114, is defined by the positioning of the depth members 130, Referring to FIGS. 3 and 9, in a further embodiment, the container 102 may further include a downward lip 302, which extends outward and downward from the top edge 304 of the vertically-inclined exterior wall 106 about the container 102, either with or without the outer ring 134. This downward lip 302 may be extended downward to merge with the outer ring 134 and thus provide a more streamlined exterior for the container 102.

Alternatively, as depicted in FIG. 5, the container 102 may include, instead of a downward lip 302 from its top edge 304, a container ring 502 and an outer ring 134.

Referring to the contact member 126 depicted in FIG. 11, the contact member 126 may include a tapered edge 1102 intended to provide a thinned top of contact member 126 to provide ease of insertion of the contact member 126 into the receiver 112. Such smoothing or reduction of the tapered edge 1102 of the contact member 126 is not intended to reduce the height 128 of the contact member 126 which is sized to fit within, contact and drive, or to dock with, the receiver 112 without difficulty and to do so without wedging or forcing the contact member 126 into the receiver 112. Thus, the depth of the receiver 112, the receiver depth 116, is preferably at least equal to the outer operable portion 138 of the contact member 126, the section of the contact member 126 adjacent the outer ring inner surface 206 when the contact member 126 fits within, contacts and drives the receiver 112 and may be at least equal to the height 128 of the contact member 126. Thus the contact member 126 preferably has a height 128 equivalent to the receiver depth 116 to ensure operable contact between the two. In the preferred embodiment, contact member 126 further includes a notch or channel 146 intermediate the outer operable portion 138 and the neck 140 and perpendicular the major axis of the handle 118, running through the first end 120 of the handle 118 and the second end 122 of the handle 118 and sized to fit about the lower edge 148 of the outer portion of the receiver 112, depicted in FIG. 2, particularly the outer member 132 or outer ring 134, and thus provide additional support and control by handle 118. Additionally, the handle 118 may be formed to present a square profile near its second end 122 adjacent the channel 146 of contact member 126. Such a square, or thicker, profile near the second end 122 provides additional stability when used.

By providing a handle 118 that never becomes integrated into the container 102 but simply docks with or contacts and drives the container 102, the cookware system 100 depicted in FIGS. 1-12 provides an advantage over present cookware for increased safety and for maximization of cooking surfaces and storage. To use in operation, as depicted in FIGS. 7(a)-(c), the operator, using the grip member 124 of non-coupling handle 118, first places the contact member 126 below the receiver 112 and particularly below the receiver downwardly-oriented opening 114, as depicted in FIG. 7(a). This placement is made easier with the presence of a dock area indicator 210. As depicted in FIG. 7(b), the contact member 126 is then moved upward to contact and drive the receiver 112, without coupling or joining to the container 102, but instead becoming only in temporary contact. Thus, so long as upward force is applied by contact member 126 to receiver 112, the contact member 126, and thus the handle 118, remain in contact and in relation to one another and the operator can control the position of the container 102, as depicted in FIG. 7(c). Thus, when the contact member 126, functioning as a male docking flange, is inserted into the receiver 112, the female docking space, from below the receiver 112, and the handle 118 is lifted, the container 102 becomes temporarily associated with to the handle assembly 142 via the handling ring assembly 144 by the weight of the container 102, expressed as a downward force on the contact member 126. While upward force is applied by the operator against the weight of container 102, the container 102 can be moved, handled and rotated freely. When the operator finishes moving the container 102 and removes the upward force against the handle assembly 142, gravity causes the handle assembly 142 to downwardly separate from the handling ring 144.

Figure 8A:
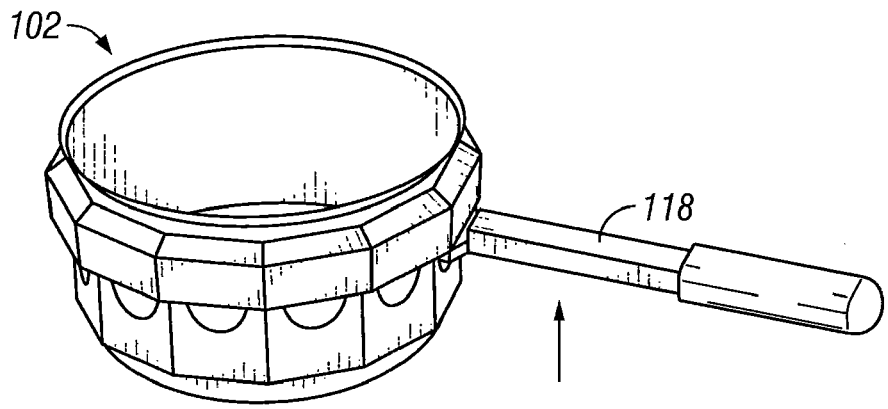
FIG. 8 is a series of illustrations (FIGS. 8(a), 8(b) and 8(c)) depicting the steps in disengaging use of the present invention.
Figure 8B:
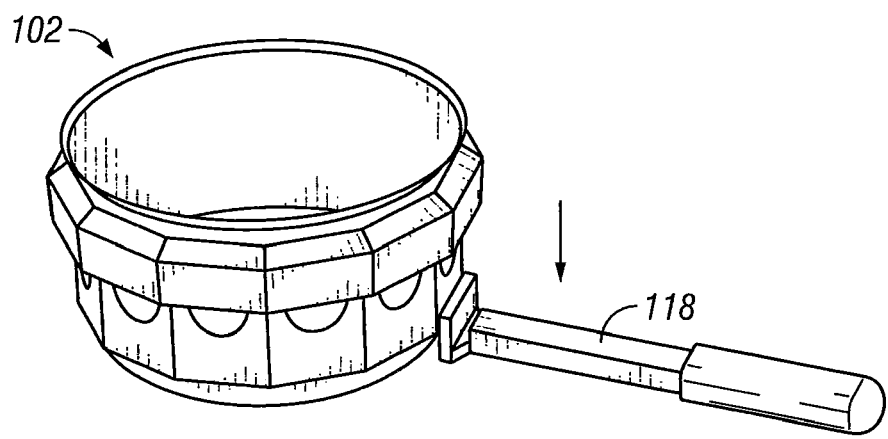
Figure 8C:
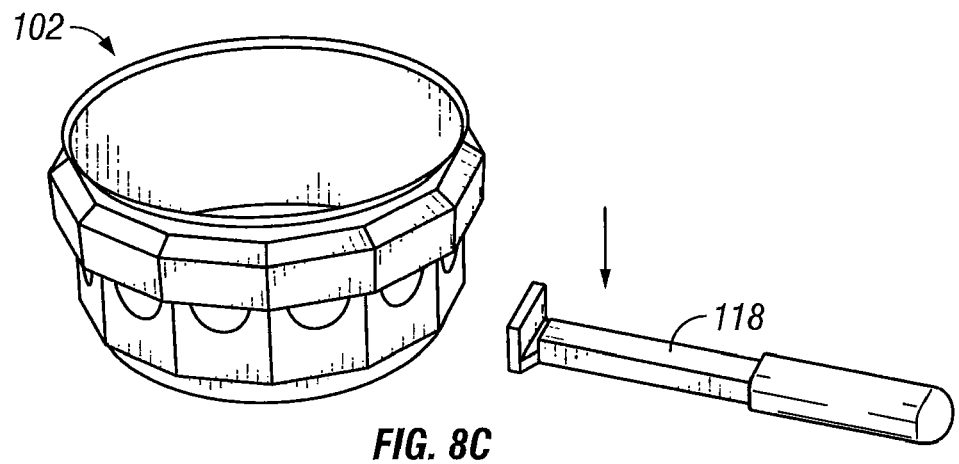

Conversely, as depicted in FIGS. 8(a)-8(c), when the upward force applied to the contact member 126 ceases to be greater than or equal to the force of gravity on the handle 118, the initial position being depicted in FIG. 8(a), the handle 118, including contact member 126, descend downward, as depicted in FIG. 8(b), until, as depicted in FIG. 8(c), the handle 118 ceases to contact and drive the receiver 112 and by association the container 102. The handle 118 therefore ceases to extend outward from the cookware 102, precluding the possibility of contact by small children with an unattended handle. Moreover, as the handle 118 ceases to contact and drive when sufficient upward force is removed, a plurality of containers 102 can be placed on a stovetop or in an oven without concern of interference among the containers 102 by their respective handles 118. For example, a pizza pan can be constructed according to the present invention so that the pan can be placed in the oven by use of a fixed and sturdy handle, which is then not subject to heating in the oven, and which can be removed from the oven by virtue of that same handle, thus avoiding the need for an oven mitt and avoiding the risk of heat penetration while moving the hot pan.

The terms and expressions which have been employed in the foregoing specification are used therein as terms of description and not of limitation, and there is no intention, in the use of such terms and expressions, of excluding equivalents of the features shown and described or portions thereof.

We claim:
1. A cookware system comprising:
 a) a container;
  said container having an interior, a vertically-inclined exterior wall, a bottom, and
  a top opening providing access to said interior;
 b) at least one receiver;
  said at least one receiver fixed in relation to said vertically-inclined exterior wall of said container,
  said at least one receiver having a receiver downwardly-oriented opening of fixed size and shape,
  said at least one receiver having depth; and
 c) a non-locking handle,
  said non-locking handle adapted to immediately and freely disengage and downwardly separate from said container absent vertical force applied to said handle,
  said handle having a first end and a second end,
  said handle having a grip member adjacent said first end of said handle,
  said handle having an upwardly-oriented contact member of fixed size and shape at said second end of said handle, and
  said upwardly-oriented contact member having height equivalent to said depth of said receiver,
  said upwardly-oriented contact member having an operable portion sized to fit within said receiver at said downwardly-oriented opening without interference.

2. The cookware system of claim 1, wherein said container is cookware for use on a stove or grill.

3. The cookware system of claim 1, wherein said container is bakeware for use in an oven.

4. The cookware system of claim 1, wherein said receiver further comprises:
 at least two spaced-apart depth members;
 an outer member; and
 said at least two spaced-apart depth members positioned intermediate said outer member and said container.

5. The cookware system of claim 1, wherein said receiver further comprises:
 a plurality of spaced-apart depth members positioned equidistant about said vertically-inclined exterior wall of said container;
 an outer ring; and
 said plurality of spaced-apart depth members positioned intermediate said outer ring and said container.

6. The cookware system of claim 5, wherein said cookware system further comprises
 an upper outer ring, said upper outer ring substantially perpendicular to said outer ring,
 said upper outer ring bounded by said outer ring, said upper outer ring inclined towards said container; and
 a reinforcing segment integrated into said upper outer ring.

7. The cookware system of claim 5, wherein said receiver further comprises:
 an inner ring; and
 said inner ring intermediate said plurality of spaced-apart depth members and said container.

8. The cookware system of claim 7, further comprising:
 said inner ring affixed to said container.

9. The cookware system of claim 8, further comprising:
said plurality of spaced-apart depth members affixed to said inner ring.

10. The cookware system of claim 9, wherein said cookware system further comprises:
an upper outer ring, said upper outer ring substantially perpendicular to said outer ring,
said upper outer ring bounded by said outer ring, said upper outer ring inclined towards said container; and
a reinforcing segment integrated into said upper outer ring.

11. The cookware system of claim 1, further comprising
a dock area indicator positioned adjacent said receiver downwardly-oriented opening of said receiver.

12. The cookware system of claim 1, wherein said container further comprises:
a plurality of spaced-apart depth members positioned equidistant about the exterior wall of said container;
a downward lip, said downward lip extending downward from the top edge of said vertically-inclined exterior wall about said container; and
said plurality of spaced-apart depth members attached to said downward lip intermediate said downward lip and said container.

13. The cookware system of claim 1, wherein said container further comprises:
a plurality of spaced-apart depth members positioned equidistant about the exterior wall of said container;
a container ring, said container ring attached to said container at a top edge of said vertically-inclined exterior wall about said container; and
said plurality of spaced-apart depth members positioned intermediate said container ring and said container.

14. The cookware system of claim 11, wherein said container, further comprises:
a plurality of spaced-apart depth members positioned equidistant about said vertically-inclined exterior wall of said container;
an outer ring;
said plurality of spaced-apart depth members positioned intermediate said outer ring and said container;
an inner ring; and
said inner ring intermediate said plurality of spaced-apart depth members and said container.

15. The cookware system of claim 14, further comprising:
said plurality of spaced-apart depth members affixed to said inner ring.

16. The cookware system of claim 4, wherein said contact member further includes a neck between said grip member and said contact member and a channel perpendicular to an major axis of said handle extending from said first end to said second end, said channel intermediate said operable portion of said contact member and said neck, said channel sized to fit about a lower edge of said outer member.

17. The cookware system of claim 5, wherein said contact member further includes a neck between said grip member and said contact member and a channel perpendicular to an major axis of said handle extending from said first end to said second end, said channel intermediate said operable portion of said contact member and said neck, said channel sized to fit about a lower edge of said outer ring.

18. The cookware system of claim 10, wherein said contact member further includes a neck between said grip member and said contact member and a channel perpendicular to an major axis of said handle extending from said first end to said second end, said channel intermediate said operable portion of said contact member and said neck, said channel sized to fit about a lower edge of said outer ring.

19. The cookware system of claim 13, wherein said contact member further includes a neck between said grip member and said contact member and a channel perpendicular to an major axis of said handle extending from said first end to said second end, said channel intermediate said operable portion of said contact member and said neck, said channel sized to fit about a lower edge of said outer ring.

20. The cookware system of claim 15, wherein said contact member further includes a neck between said grip member and said contact member and a channel perpendicular to an major axis of said handle extending from said first end to said second end, said channel intermediate said operable portion of said contact member and said neck, said channel sized to fit about a lower edge of said outer ring.

* * * * *